US011359651B2

(12) United States Patent
Potts et al.

(10) Patent No.: US 11,359,651 B2
(45) Date of Patent: Jun. 14, 2022

(54) FLOW MODIFICATION DEVICE HAVING HELICAL STRAKES AND A SYSTEM AND METHOD FOR MODIFYING FLOW

(71) Applicant: AMOG Technologies Pty Ltd, Notting Hill (AU)

(72) Inventors: Andrew Elmhirst Potts, North Balwyn (AU); Hayden Marcollo, Box Hill North (AU)

(73) Assignee: AMOG Technologies Pty Ltd, Victoria (AU)

( * ) Notice: Subject to any disclaimer, the term of this patent is extended or adjusted under 35 U.S.C. 154(b) by 883 days.

(21) Appl. No.: 16/076,117

(22) PCT Filed: Mar. 31, 2017

(86) PCT No.: PCT/AU2017/050282
§ 371 (c)(1),
(2) Date: Aug. 7, 2018

(87) PCT Pub. No.: WO2017/165926
PCT Pub. Date: Oct. 5, 2017

(65) Prior Publication Data
US 2021/0270297 A1   Sep. 2, 2021

(30) Foreign Application Priority Data
Apr. 1, 2016 (AU) .................. 2016901214

(51) Int. Cl.
*F16L 55/02* (2006.01)
*F15D 1/00* (2006.01)
(Continued)

(52) U.S. Cl.
CPC .............. *F15D 1/003* (2013.01); *B63B 22/00* (2013.01); *E02B 17/0017* (2013.01);
(Continued)

(58) Field of Classification Search
CPC ........... F15D 1/003; F15D 1/12; B63B 22/00; B63B 2241/10; E02B 17/0017;
(Continued)

(56) References Cited

U.S. PATENT DOCUMENTS 4,422,801 A    12/1983   Hale et al.
6,019,549 A *   2/2000   Blair ...................... E01D 19/02
                                                        24/460
(Continued)

FOREIGN PATENT DOCUMENTS

DE         2744277        4/1978
DE         3609541        9/1987
(Continued)

OTHER PUBLICATIONS

International Search Report and Written Opinin issued in connection with International Patent Application No. PCT/AU2017/050282, dated May 17, 2017, 10 pages.
(Continued)

*Primary Examiner* — Minh Q Le
(74) *Attorney, Agent, or Firm* — Duane Morris LLP

(57) ABSTRACT

A flow modification device connectable to a generally cylindrical element adapted for immersion in a fluid medium is provided. The device comprises an elongate body having a length and a generally circular cross-section; a plurality of raised body portions disposed about and extending along the length of the elongate body, the raised body portions having a height between 2% and 10% of a diameter of the body; and an aperture extending through the length of the elongate body, the aperture being adapted to receive the generally cylindrical element such that the flow modification device is arranged about the cylindrical element. The plurality of raised body portions are helically arranged or twisted about a longitudinal axis of the elongate body and are adapted to
(Continued)

reduce vortex-induced vibration and/or drag on the cylindrical element when the device is connected to the cylindrical element and the connected device and cylindrical element are immersed in the fluid medium and there is relative movement between the connected device and cylindrical element and the fluid medium.

18 Claims, 10 Drawing Sheets

(51) Int. Cl.

| | | |
|---|---|---|
| *B63B 22/00* | (2006.01) | |
| *E02B 17/00* | (2006.01) | |
| *E21B 17/01* | (2006.01) | |
| *F15D 1/12* | (2006.01) | |
| *F16L 1/12* | (2006.01) | |
| *F16F 15/023* | (2006.01) | |
| *F16F 7/14* | (2006.01) | |
| *F16K 47/00* | (2006.01) | |

(52) U.S. Cl.
CPC .............. *E21B 17/01* (2013.01); *F15D 1/12* (2013.01); *F16L 1/123* (2013.01); *B63B 2241/10* (2013.01); *F16F 7/14* (2013.01); *F16F 15/023* (2013.01); *F16K 47/00* (2013.01)

(58) Field of Classification Search
CPC .......... E21B 17/01; F16L 1/123; F16K 47/00; F16F 7/14; F16F 15/023
USPC .... 137/1, 833, 808, 343, 372; 416/106, 190, 416/191, 500; 405/21, 169, 184.2, 198, 405/211, 216, 302.5; 114/243
See application file for complete search history.

(56) References Cited

U.S. PATENT DOCUMENTS

| | | | |
|---|---|---|---|
| 6,223,372 B1 | 5/2001 | Barber | |
| 6,401,646 B1* | 6/2002 | Masters | B63B 21/502 |
| | | | 114/243 |
| 6,695,540 B1* | 2/2004 | Taquino | E21B 17/01 |
| | | | 405/216 |
| 6,896,447 B1* | 5/2005 | Taquino | E21B 17/01 |
| | | | 405/216 |
| 6,953,308 B1* | 10/2005 | Horton | B63B 35/44 |
| | | | 405/211 |
| 7,513,209 B2 | 4/2009 | Masters et al. | |
| 7,635,237 B2* | 12/2009 | Spears | C23F 13/18 |
| | | | 204/196.17 |
| 8,256,993 B2* | 9/2012 | Branchut | F16L 1/123 |
| | | | 405/224.2 |
| 8,443,896 B2 | 5/2013 | Howard et al. | |
| 8,770,894 B1* | 7/2014 | Allen | E21B 17/01 |
| | | | 405/211.1 |
| 8,944,722 B1 | 2/2015 | Allen et al. | |
| 9,803,431 B1* | 10/2017 | Allen | E21B 17/01 |
| 10,323,665 B2* | 6/2019 | Potts | F15D 1/12 |
| 10,400,518 B2* | 9/2019 | Shi | E21B 17/012 |
| 10,473,131 B1* | 11/2019 | Allen | F16L 1/123 |
| 10,774,949 B2* | 9/2020 | Esselbrugge | F15D 1/10 |
| 2002/0168232 A1 | 11/2002 | Xu et al. | |
| 2006/0231008 A1 | 10/2006 | Allen et al. | |
| 2006/0280559 A1 | 12/2006 | Allen et al. | |
| 2007/0231077 A1 | 10/2007 | Burgess | |
| 2008/0131210 A1 | 6/2008 | Wajnikonis | |
| 2009/0185867 A1 | 7/2009 | Masters et al. | |
| 2009/0185868 A1 | 7/2009 | Masters et al. | |
| 2009/0252559 A1 | 8/2009 | Masters et al. | |
| 2009/0238645 A1* | 9/2009 | Aristaghes | E02B 3/06 |
| | | | 405/21 |
| 2010/0215440 A1 | 8/2010 | Wajnikonis | |
| 2013/0330131 A1 | 12/2013 | Meijer | |
| 2015/0086276 A1 | 3/2015 | Harbison et al. | |
| 2015/0152610 A1 | 6/2015 | Georgakis et al. | |
| 2018/0180199 A1* | 6/2018 | Potts | E21B 17/012 |
| 2019/0218866 A1* | 7/2019 | Allen | E21B 17/22 |

FOREIGN PATENT DOCUMENTS

| | | |
|---|---|---|
| FR | 2367148 | 5/1978 |
| GB | 2335248 | 9/1999 |
| WO | 2002072995 | 9/2002 |
| WO | 2002095278 A1 | 11/2002 |
| WO | 2009035481 | 3/2009 |
| WO | 2016205898 A1 | 12/2016 |

OTHER PUBLICATIONS

International Search Report and Written Opinion for International Application No. PCT/AU2016/050550, dated Oct. 7, 2016, 10 pages.

Supplementary European Search Report for European Patent Application No. EP17772884, dated Jan. 14, 2019, 9 pages.

\* cited by examiner

FLOW MODIFICATION DEVICE HAVING HELICAL STRAKES AND A SYSTEM AND METHOD FOR MODIFYING FLOW

CROSS-REFERENCE TO RELATED APPLICATIONS

This application is a U.S. national stage application under 35 U.S.C. § 371 of International Application No. PCT/AU2017/050282, filed Mar. 31, 2017, which claims priority to Australian patent application No. 2016901214, filed Apr. 1, 2016, the entireties of which are incorporated herein by reference.

FIELD OF THE INVENTION

The present invention relates to devices, systems and methods for reducing vortex-induced vibration (VIV) and/or overall drag on a generally cylindrical or tubular element immersed in a fluid medium. The invention is particularly suited to reducing VIV and drag on marine structures such as risers, umbilicals, cables, and pipelines.

BACKGROUND OF THE INVENTION

Cylindrical structures such as marine risers, umbilicals, cables, and pipelines will generally be subject to vortex-induced vibration excitation when immersed in a flowing fluid medium, or when moving relative to the fluid medium. This dynamic excitation can result in an amplified drag force and a decreased operating life due to fatigue.

In the offshore industry, cylindrical structures are used in production and drilling risers, pipelines near the seabed, seawater intakes, discharge lines, and many other similar structures. Generally, these cylindrical structures will be subject to VIV, which can be more problematic with greater flow/current speed and longer cylinder lengths.

Flow modification devices have been developed to reduce the level or severity of VIV on cylindrical structures. These flow modification devices aim to prevent coherent vortices from shedding about the cylindrical structure. U.S. Pat. No. 8,443,896 describes a flow modification device, in the form of a plurality of helical strakes, connectable to a marine riser. Helical strakes may reduce the severity of VIV to very small levels, but are generally large and not practical to handle. For example, drilling risers involve deployment, retrieval, and stacking operations which are not easily achieved with large helical strake devices.

U.S. Pat. Nos. 7,513,209 and 6,223,672 describe rigid fairing devices connectable to marine risers. Rigid fairings aim to suppress VIV by streamlining and delaying separation of the flow about the cylindrical structure. Rigid fairings are typically unidirectional devices and generally involve clamping the fairing to the cylindrical structure. The clamping process can be time consuming, which is disadvantageous in light of expensive production and operating schedules, for example, when undertaking drilling operations.

Vortex shedding about cylindrical structures is generally described in *Flow-Induced Vibrations: An Engineering Guide* (2005) by Naudacher, E. and Rockwell, D. from Dover Publications, which is incorporated herein by reference. Further flow modification devices and/or methods are disclosed in the following patent publications: FR 2367148, WO 2002/095278, and WO 2009/035481.

It is an object of the present invention to provide flow modification devices, systems, and methods which overcome, or at least ameliorate, one or more deficiencies of the prior art, or at least provides a useful alternative.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides a flow modification device connectable to a generally cylindrical element adapted for immersion in a fluid medium, the device comprising:

an elongate body having a length and a generally circular cross-section;

a plurality of raised body portions disposed about and extending along the length of the elongate body, the raised body portions having a height between 2% and 10% of a diameter of the body; and an aperture extending through the length of the elongate body, the aperture being adapted to receive the generally cylindrical element such that the flow modification device is arranged about the cylindrical element;

wherein the plurality of raised body portions are adapted to reduce vortex-induced vibration and/or drag on the cylindrical element when the device is connected to the cylindrical element and the connected device and cylindrical element are immersed in the fluid medium and there is relative movement between the connected device and cylindrical element and the fluid medium.

The plurality of raised body portions may be arranged generally parallel to a longitudinal axis of the body. In at least this embodiment, the plurality of raised body portions may not be continuous along the entire length of the elongate body. For example, in one embodiment, there may be a first plurality of raised body portions disposed along a first length of the elongate body, and there may be a second plurality of raised body portions disposed along an adjacent second length of the elongate body. In this embodiment, the second plurality of raised body portions may be off-set about the longitudinal axis with respect to the first plurality of raised body portions such that the second plurality of raised body portions are not aligned with the first plurality of raised body portions. In one particularly preferred embodiment, the second plurality of raised body portions are longitudinally off-set or rotated about the longitudinal axis with respect to the first plurality of raised body portions by a rotation angle, which rotation angle is preferably approximately half the angle between adjacent raised body portions of the first plurality of raised body portions (as measured from centrelines of adjacent raised body portions). The flow modification device may also include one or more additional pluralities of raised body portions disposed along one or more additional respective lengths of the elongate body, and each of the one or more additional pluralities of raised body portions may be longitudinally off-set or rotated about the longitudinal axis with respect to an adjacent plurality of raised body portions disposed along an adjacent length of the elongate body. Hence the elongate body may include 2, 3, 4 or more lengths of raised body portions in which each length of raised body portion is longitudinally offset or rotated about the longitudinal axis with respect to an adjacent length of raised body portion.

In another embodiment, the plurality of raised body portions may be helically arranged (or twisted) about the longitudinal axis of the elongate body. The raised body portions may have a helical pitch of between 5 and 20 times a diameter of the elongate body preferably between 10 and 20, more preferably between 15 and 20, but most preferably the pitch is 20 times the diameter of the elongate body. The pitch of a helically twisted raised body portion is defined as being the width of one complete helix turn as measured parallel to the longitudinal axis of the elongate body. In one embodiment, the pitch of the helically twisted raised body portions may be substantially constant along the length of the elongate body. In an alternative embodiment, the pitch of the helically twisted raised body portions may be variable along the length of the elongate body. For example, the pitch may vary between 5 and 20 times the diameter of the elongate body along the length of the elongate body. The height of the raised body portions may also vary along the length of the elongate body.

Preferably, the elongate body includes between 3 and 16 raised body portions (or ridges or strakes) disposed equidistant about the elongate body. In one embodiment, the elongate body includes a relatively low number of raised body portions disposed equidistant about the elongate body (for example 3, 4, or 5 raised body portions). In an alternative embodiment, the elongate body includes a relatively high number of raised body portions disposed equidistant about the elongate body (for example 12, 14, or 16 raised body portions). In a particularly preferred embodiment, the elongate body includes an odd number of raised body portions. It has been discovered that an odd number of raised body portions results in a lower amplitude of vibration of the generally cylindrical element (as compared to an adjacent even number of raised body portions). In an alternative embodiment, the raised body portions may be disposed in a manner about the elongate body such that adjacent raised body portions are not equidistant from one another. In a further alternative embodiment, adjacent raised body portions may have a differing height.

Preferably, each of the plurality of raised body portions are generally curved or rounded ridges and have radii between 2% and 38% of the diameter of the body. As used throughout this specification, the terms "curved ridges", "curved raised body portions", "curved strakes" or any similar variations define any suitably curved or curve-like raised body portion geometry, or any substantially continuous geometry having no definite corners. For example, in one embodiment, the raised body portions may be generally parabolic in shape.

In an alternative non-curved embodiment, the plurality of raised body portions may be generally trapezoidal in shape, or may be generally trapezoidal ridges.

Optionally, the raised body portions define respective grooved body portions therebetween. In an embodiment, the respective grooved body portions are generally concave and have a generally curved or parabolic shape. In a preferred embodiment, the generally curved grooved body portions have radii between 0.75% and 78% of the diameter of the body. In an alternative embodiment, the grooved body portions may be generally convex (or outwardly directed) and may have a generally curved shape (or the grooved body portions may adopt the primary or base shape of the generally circular elongate body, or be concentric thereto).

In an embodiment, the flow modification device comprises at least two releasably connectable complementary parts, such as a first part and a second part. In a preferred embodiment, the flow modification device is divided about its longitudinal axis to define the first and second parts. In this embodiment, the first part may be a first half of the flow modification device, and the second part may be a second half of the flow modification device. Advantageously, in this embodiment, the first and second parts may be releasably connectable, for example by a clamping means, so as to releasably secure the flow modification device about the cylindrical element.

The elongate body of the flow modification device may include opposite tapering ends, which ends are preferably conical in shape.

In an embodiment, the generally cylindrical element is a continuous rubber or metal extrusion. In an alternative embodiment, the cylindrical element is a composite winding. In a still further alternative embodiment, the cylindrical element is a continuous reinforced concrete element. The cylindrical element may be a marine riser, cable, umbilical, tubular member, or other similar structural element.

Advantageously, the flow modification device may be externally fitted, for example by sliding or clamping, to any type of generally cylindrical or tubular structure immersed in a fluid. Such structures include, by way of example only, chimneys, cables, drilling risers and their buoyancy elements, moorings, risers and umbilicals on fixed platforms, riser and umbilical distributed buoyancy elements (the buoys themselves) such as lazy wave risers, seawater intakes, semisubmersible legs and bracing members, spars, and subsea systems including rigid seabed spools. The present flow modification device is particularly suited for connection to buoyancy elements. Buoyancy elements typically comprise syntactic foam with rigid outer shells, and are designed to withstand large hydrostatic crushing pressures at great sea depths. Their displacement provides buoyancy to the structural element that they are connected to. In an embodiment, the present flow modification device may be fabricated such that it has the abovementioned features of typical buoyancy elements.

Advantageously, the flow modification device reduces VIV and drag on the cylindrical element when the flow modification device (or a plurality of flow modification devices) are arranged about and releasably secured to the cylindrical element.

In a second aspect, the present invention provides a flow modification system for the reduction of vortex-induced vibration and/or drag on a generally cylindrical element immersed in a fluid medium, the system comprising:

a plurality of flow modification devices according to the first aspect of the invention, wherein each flow modification device is arranged about and extends along the cylindrical element; and a means for releasably securing each of the plurality of flow modification devices about the cylindrical element.

Preferably, the means for releasably securing a flow modification device about the cylindrical element comprises an elongate strap. The elongate strap may be receivable about the elongate body of the flow modification device. The elongate strap may include recessed tensioners or internal bolted fasteners that act to tighten the elongate strap about the flow modification device (and therefore the cylindrical element).

In an embodiment having generally parallel raised body portions, the plurality of raised body portions of a first flow modification device may be aligned with the plurality of raised body portions of a second adjacent flow modification device. In an alternative embodiment, the raised body portions of the first flow modification device may not be aligned with the plurality of raised body portions of the second adjacent flow modification device. In this embodiment, the raised body portions of the first flow modification device may be longitudinally off-set or rotated about the longitudinal axis by half the angle between the adjacent raised body portions (as measured from a centreline of the raised body portion). The rotation may occur in the longitudinal direction every three to five times the diameter of the elongate body.

In an embodiment having helically twisted raised body portions, the pitch of a first flow modification device may be similar to the pitch of a second adjacent flow modification device. In an alternative embodiment, the pitch of the first flow modification device may be different to the pitch of the second adjacent flow modification device. In either embodiment, the pitch of the first and second flow modification devices may be substantially constant or may vary along the length of the elongate body. In a further alternative embodiment, the first flow modification device may have generally parallel raised body portions, and the second adjacent flow modification device may have helically twisted raised body portions.

In a third aspect of the invention, there is provided a method for reducing vortex-induced vibration and/or drag on a generally cylindrical element immersed in a fluid medium, the method comprising the steps of:

arranging a plurality of flow modification devices according to the first aspect of the invention about the cylindrical element, and releasably securing each of the plurality of flow modification devices to the cylindrical element.

Preferably, the means for releasably securing a flow modification device about the cylindrical element comprises an elongate strap. The elongate strap may be receivable about the elongate body of the flow modification device.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 8 shows the total drag under freely vibrating conditions;

DETAILED DESCRIPTION OF THE EMBODIMENTS

Figure 1:
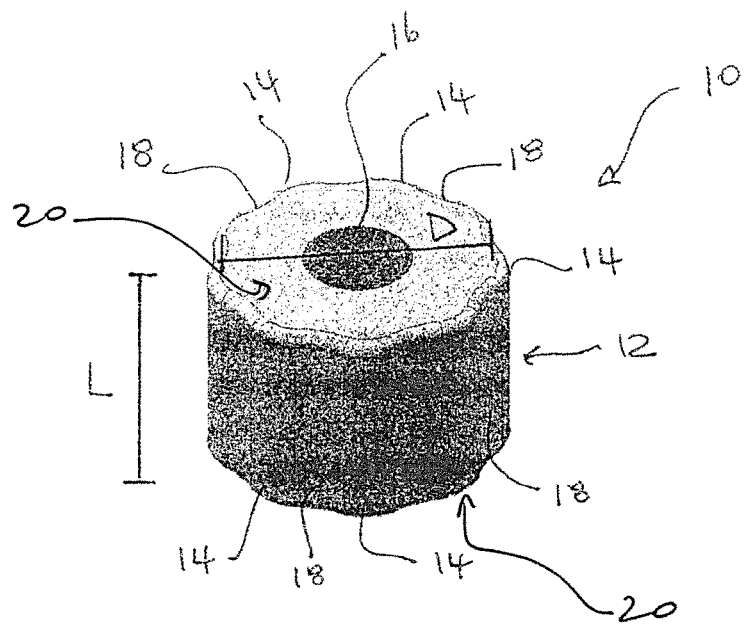
FIG. 1 is a perspective view of a flow modification device according to an embodiment of the invention.

Referring to FIG. 1, there is shown a flow modification device 10 connectable to a generally cylindrical element (not shown) immersed in a fluid medium such as water or air. The generally cylindrical element may be a marine riser, cable, umbilical, or other similar tubular member.

The flow modification device 10 provides vortex-induced vibration (VIV) suppression and drag reduction advantages due to the cross-sectional shape of the device 10. The cross-sectional shape of the device 10 alters the way in which vortices are formed as compared to typical substantially circular cross-sections, as described below in relation to FIG. 9.

The flow modification device 10 may be connected to or installed on an existing cylindrical element. Alternatively, a cylindrical element may be manufactured such its cross-section includes the features of the flow modification device 10. In other words, the flow modification device 10 of FIG. 1 may be cylindrical element, such as a marine riser, cable, umbilical, or other tubular member, and not a separate device connectable to a cylindrical element. As such, throughout this description, a reference to the features of the flow modification device 10 also applies to a cylindrical element incorporating such features. Advantageously, by manufacturing a cylindrical element having the described cross-section, a separate flow modification device 10 is not required to be installed about the cylindrical element. Rather, the cylindrical element will include all the necessary structural features to suppress or reduce VIV and drag according to the invention.

In the embodiment of FIG. 1, the flow modification device 10 includes an elongate body 12 having a length L and a generally circular cross-section. The device 10 also includes a plurality of raised body portions (or strakes) in the form of generally curved or rounded ridges 14 disposed about and extending along the length L of the elongate body 12. In the embodiment shown, the curved ridges 14 are arranged generally parallel to a longitudinal axis of the elongate body 12 and have a height between 2% and 7.5% of a diameter D of the body 12. The diameter D is the diameter of a circle drawn through the outermost edges of the raised body portions. In other words, a circle intersecting the outermost edges of the raised body portions would have the diameter D. The flow modification device 10 includes substantially flat or planar opposite ends 20 which define the length of the elongate body 12. However, in an alternative non-illustrated embodiment, the elongate body 12 may have opposite tapering ends, which ends are preferably conical in shape.

In an alternative non-illustrated embodiment, the raised body portions or curved ridges may be helically arranged (or twisted) about the longitudinal axis of the elongate body. The raised body portions may have a helical pitch of between 5 and 20 times a diameter of the elongate body, but preferably the pitch is 20 times the diameter of the elongate body. In one non-illustrated embodiment, the pitch of the helically twisted raised body portions may be substantially constant along the length of the elongate body. In an alternative non-illustrated embodiment, the pitch of the helically twisted raised body portions may be variable along the length of the elongate body. For example, the pitch may vary between 5 and 20 times the diameter of the elongate body along the length of the elongate body.

The flow modification device 10 also includes an aperture 16 extending through the length L of the elongate body 12. The aperture 16 is appropriately sized and dimensioned so as to receive the generally cylindrical element (not shown) such that the flow modification device 10 is arranged about the cylindrical element. The plurality of raised body portions or curved ridges 14 are adapted to reduce vortex-induced vibration and drag on the cylindrical element when the device 10 is connected to the cylindrical element, and when the device 10 and cylindrical element are immersed in the fluid medium and there is relative movement between the fluid medium and cylindrical element.

As shown in FIG. 1, the plurality of raised body portions or curved ridges 14 define respective grooved body portions 18 therebetween. The grooved body portions 18 are generally concave and have a generally inverted or inwardly directed curved or parabolic shape (as compared to the outwardly directed curved or parabolic shape of the raised body portions or ridges 14). Alternatively, the grooved body portions 18 may adopt the primary or base shape of the generally circular elongate body 12 (as is shown particularly in FIG. 4).

Figure 2:
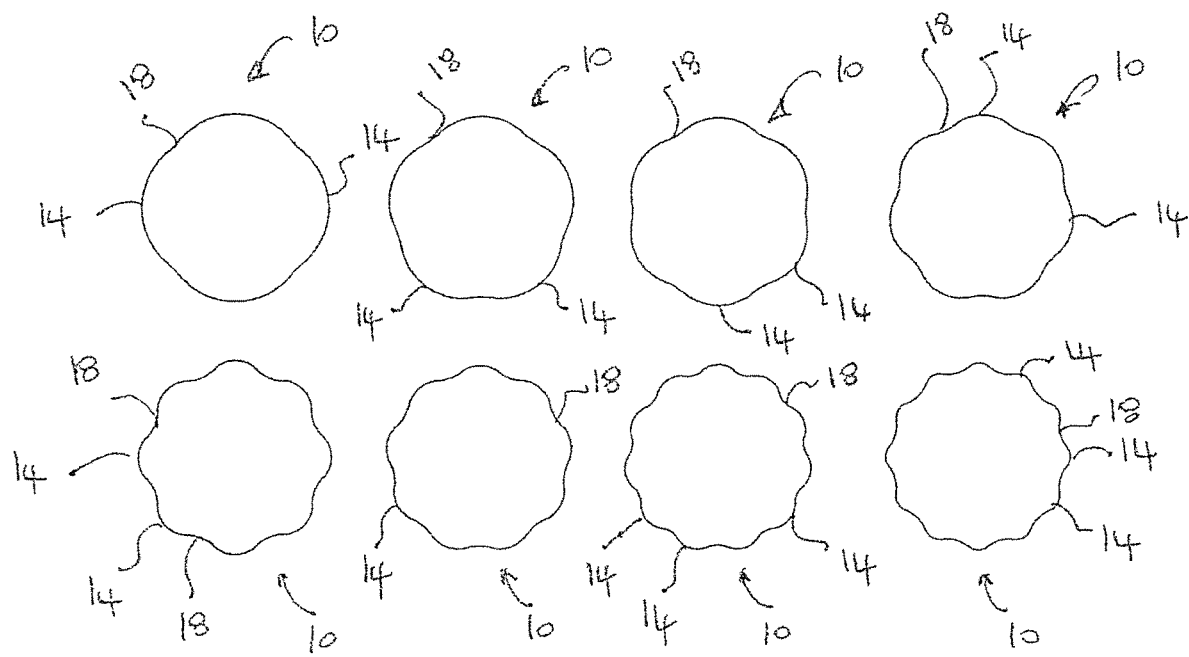
FIG. 2 is a cross-sectional view of alternative flow modification devices according to various alternative embodiments of the invention.

Referring to FIG. 2, there is shown several cross-sectional views of alternative embodiments of the flow modification device 10. In one embodiment, the flow modification device 10 includes four raised body portions or curved ridges 14 disposed equidistant about the elongate body (shown top-left). In alternative embodiments, the flow modification device 10 includes either five, six, seven, eight, nine, eleven, or twelve raised body portions or curved ridges 14 (shown top-left to bottom-right respectively). The number and relative size of the curved ridges 14 has an effect on the amplitude of vibration and the coefficient of drag of the cylindrical element, as is described below. The grooved body portions 18 disposed intermediate to adjacent raised body portions or ridges 14 have radii between 0.75% and 78% of the diameter of the elongate body 12.

Figure 3:
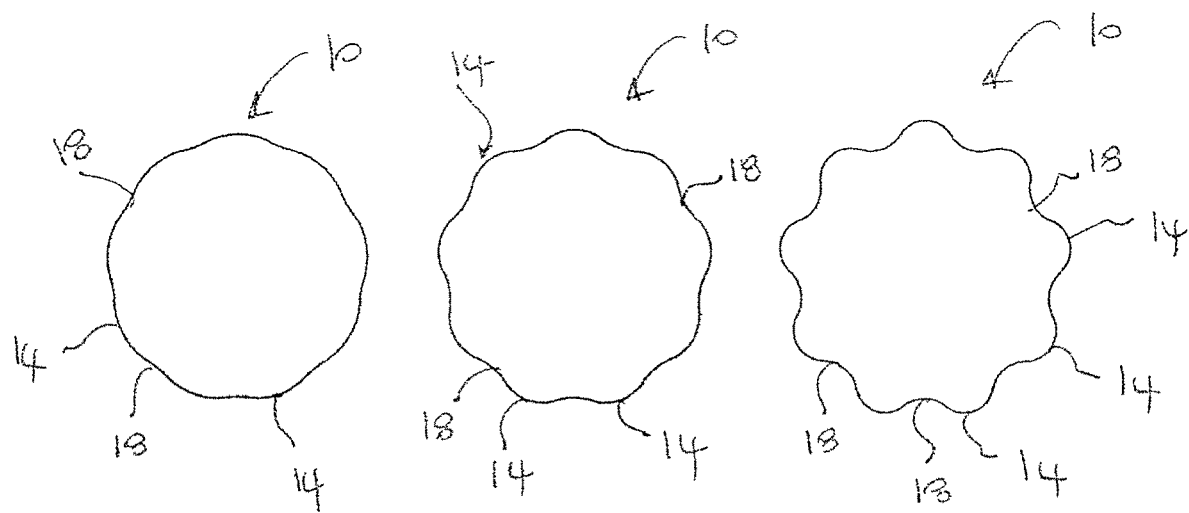
FIG. 3 is a cross-sectional view of alternative flow modification devices similar to FIG. 2.

FIG. 3 shows further alternative embodiments of the flow modification device 10. In one embodiment, the flow modification device 10 includes nine raised body portions or curved ridges 14 disposed equidistant about the elongate body (shown far-left). In this embodiment, the height of the curved ridges 14 is 2% of the diameter of the body 12. In alternative embodiments, the height of the curved ridges 14 is 3.8% or 7.1% of the diameter (shown left to right respectively).

Figure 4:
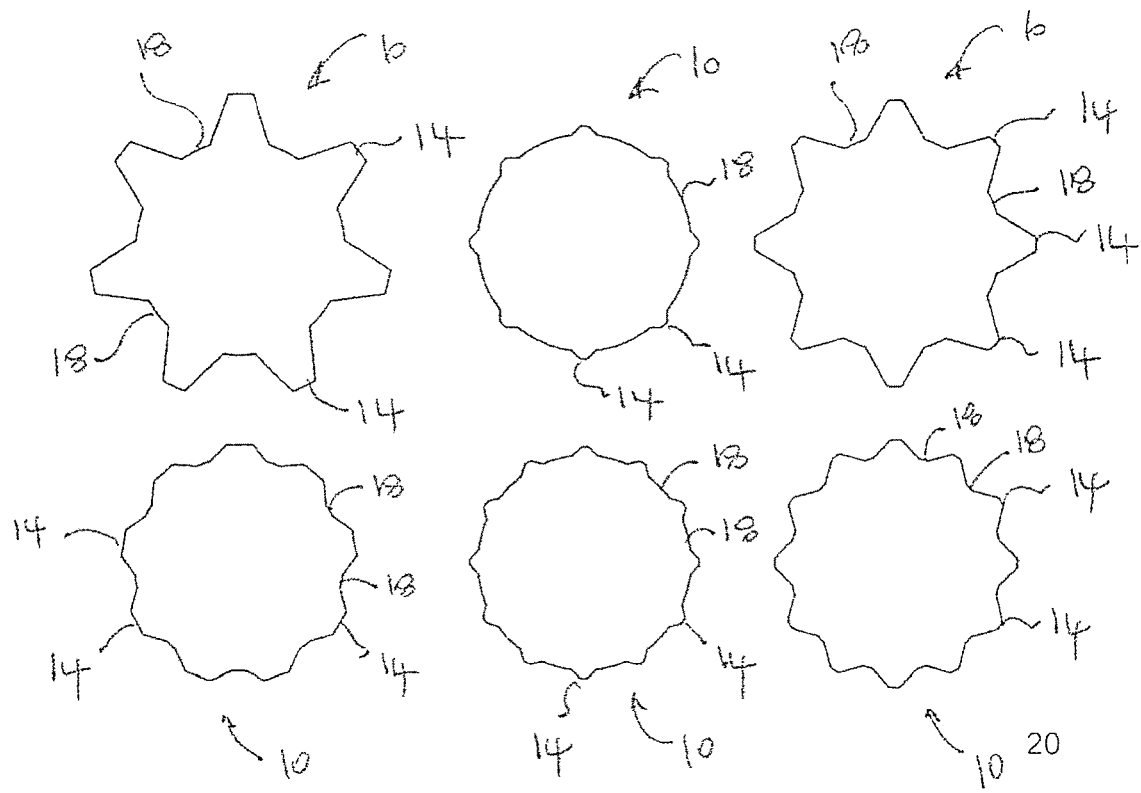
FIG. 4 is a cross-sectional view of alternative flow modification devices similar to FIGS. 2 and 3.

FIG. 4 shows further alternative embodiments of the flow modification device 10. In one embodiment, the flow modification device 10 includes seven raised body portions in the form of generally trapezoidal ridges or strakes 14 disposed equidistant about the elongate body (shown top-left). In alternative embodiments, the flow modification device 10 includes either eight, nine, or twelve trapezoidal ridges 14 (shown top-left to bottom-right respectively).

Figure 5:
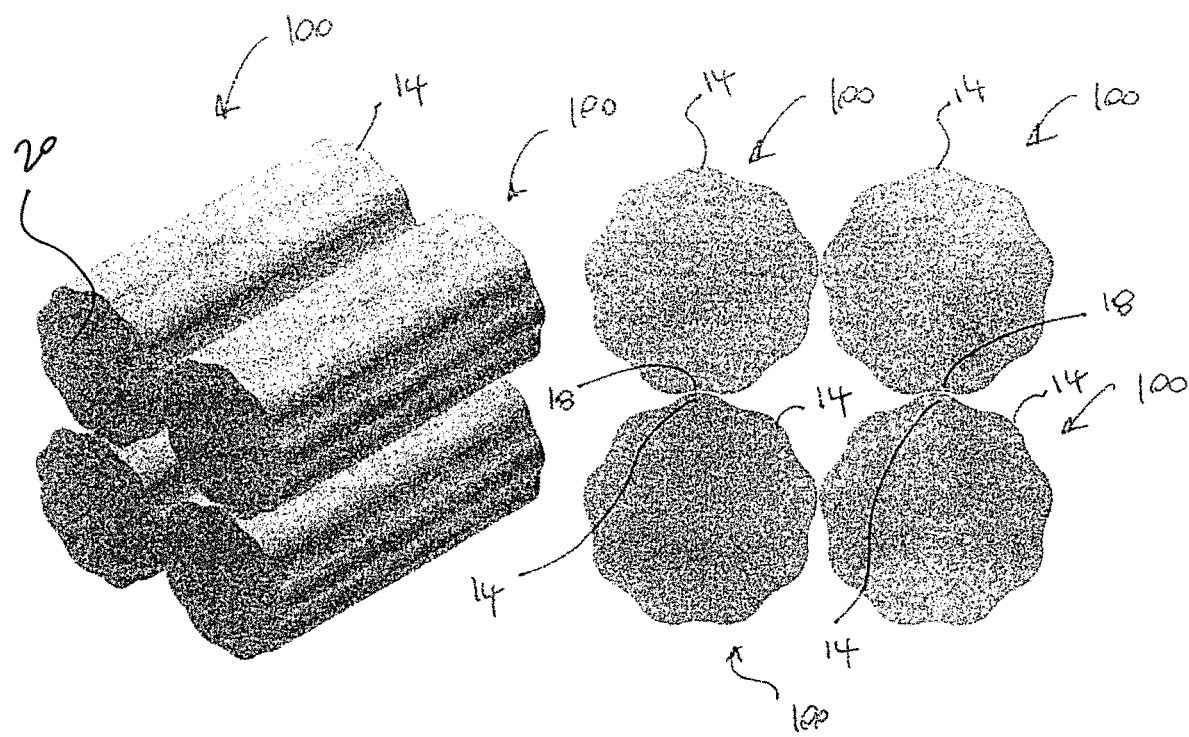
FIG. 5 is a perspective view of a plurality of generally cylindrical elements according to an embodiment of the invention.

Advantageously, as shown in FIG. 5, a plurality of cylindrical elements 100 incorporating the above described features of the flow modification device 10 are stackable, for example, on a deck of a drilling rig. As shown in FIG. 5, the raised body portions or curved ridges 14 of a lowermost cylindrical element are substantially seated or received within the grooved body portions 18 of an uppermost cylindrical element, thereby allowing the lowermost and uppermost cylindrical elements to be stacked. In this sense, the curved ridges 14 act a male "locking" feature to the complementary female grooved body portions 18.

As described previously, the flow modification device 10 may be manufactured as a buoyancy element. In this embodiment, an outer shell comprising fibreglass or polyethylene is initially constructed. The outer shell may be moulded such that it has the above described cross-sectional features. Closed-cell foam, such as syntactic foam may then be injected or set within the outer shell. The syntactic foam may consist of macro-spheres and/or micro-spheres and/or resin depending upon the application and water depth being designed for. The required material will be apparent to those skilled in the relevant art. In an alternative embodiment, the flow modification device 10 may be entirely machined out of closed-cell or syntactic foam. In this embodiment, a separate outer shell is not required to be constructed.

Several tests were conducted to assess the effectiveness of different embodiments of the above described flow modification device 10 or cylindrical element 100. The tests were performed in a water channel having a flow with a Reynolds number between 2,000 and 10,000, and with a spring mounted rigid cylinder constrained to vibrate in the cross-flow direction only. The cylinder had an immersed depth of 0.6 m and a diameter of 40 mm. Instrumentation consisted of a linear variable differential transformer (LVDT) for determining displacement time history, and strain gauges for determining inline (drag) and cross-flow force time histories.

Figure 6:
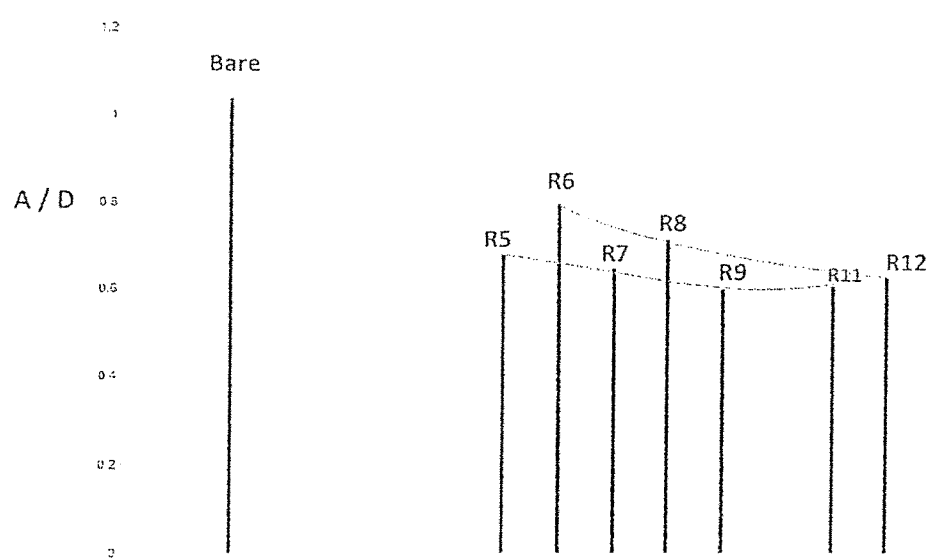
FIG. 6 is a plot of the vibration characteristics of various flow modification devices or cylindrical elements according to embodiments of the invention.

The amplitude of vibration of various flow modification devices 10 or cylindrical elements 100 incorporating curved or rounded ridges according to the invention is plotted against a bare cylinder (i.e. a cylinder having a standard circular cross-section) in FIG. 6. The values referred to as R5 to R12 on the x-axis refer to the number of curved or rounded ridges 14 disposed about the elongate cylindrical body 12. For example, R5 refers to a flow modification device or cylindrical element incorporating five curved ridges 14, whereas R12 refers to a flow modification device or cylindrical element incorporating twelve curved ridges 14. The amplitude of vibration is represented on the y-axis by the non-dimensional quantity A/D and is the mean of the maximum amplitude of vibration for a series of steady state tests. As can be seen in FIG. 6, a flow modification device or cylindrical element incorporating nine curved ridges 14 exhibited the lowest amplitude of vibration compared to the other tested cylindrical elements. In every case, the flow modification device 10 or cylindrical element 100 exhibited a lower amplitude of vibration as compared to the bare cylinder.

Figure 7:
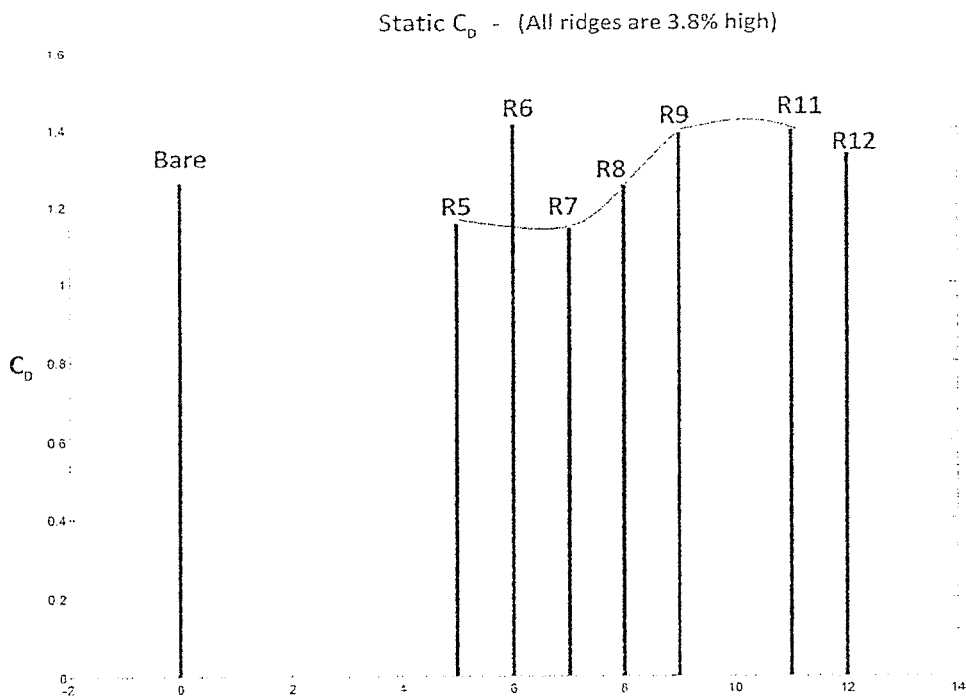
FIG. 7 is a plot of the static drag characteristics of various flow modification devices or cylindrical elements according to embodiments of the invention.

FIG. 7 details the static drag performance of the various flow modification devices 10 or cylindrical elements 100. The static drag is represented by the drag coefficient $C_D$, which is plotted on the y-axis. The various geometries (i.e. R5 to R12) are plotted on the x-axis. The drag coefficient $C_D$ is a non-dimensional quantity that is used to quantify the drag or resistance of an object in a fluid medium. A lower drag coefficient indicates that an object will have lower total drag as compared to an object having a higher drag coefficient. As can be seen in FIG. 7, embodiments of the flow modification device 10 or cylindrical element 100 incorporating five, seven, or eight curved ridges 14 realise the greatest static drag benefits.

Figure 8:
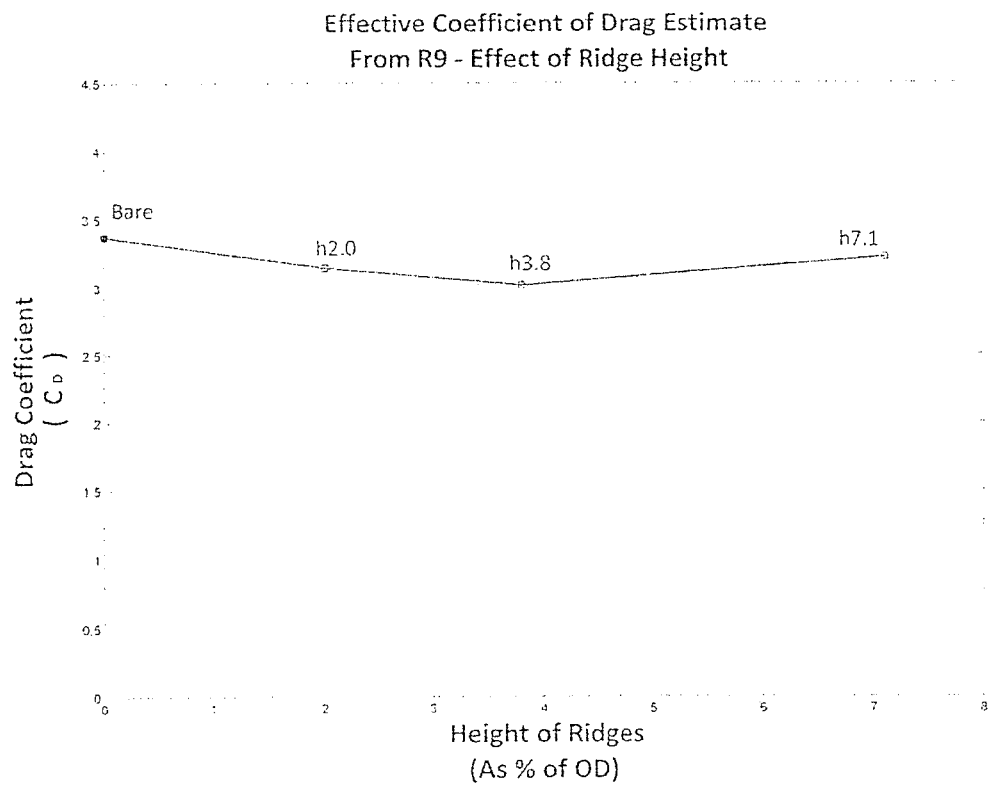
FIG. 8 is similar to FIG. 7, except

FIG. 8 details the total performance drag under freely vibrating conditions of the R9 cylinder, i.e. the flow modification device or cylindrical element incorporating nine curved or rounded ridges 14, having a height of 2.0%, 3.8%, or 7.1% of the diameter (referred to as 'OD' in FIG. 8) of the body 12. As can be seen from FIG. 8, a preferred embodiment of the flow modification device 10 or cylindrical element 100 having nine curved ridges 14 and a curved ridge height of approximately 3.8% yields the lowest total dynamic drag coefficient of the results plotted in FIG. 8.

Figure 9:
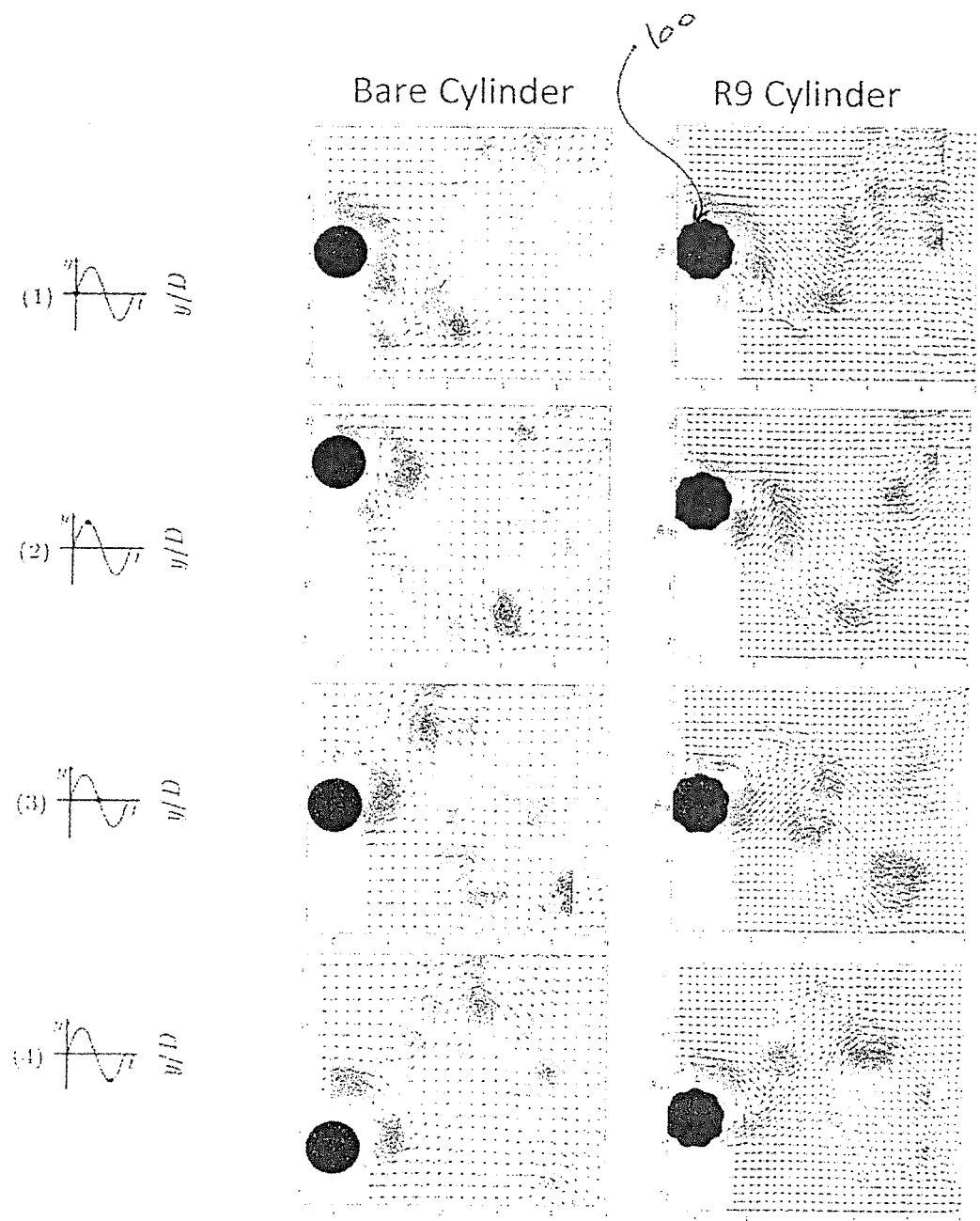
FIG. 9 is a plot of the vorticity wake formation of a flow modification device according to an embodiment of the invention.

FIG. 9 details the downstream vorticity wake formation performance of the R9 cylinder as compared to the bare cylinder. Downstream vorticity wake formation is a way of assessing how vortices are shed from a cylinder. As shown in FIG. 9, the flow modification device 10 or cylindrical element 100 advantageously sheds an elongated vortex per half cycle rather than a circular vortex per half cycle, which results in a reduced peak loading. By reducing the peak loading, the R9 cylinder is subject to less vibration and drag (and therefore less fatigue) as compared to the bare cylinder.

Figure 15:
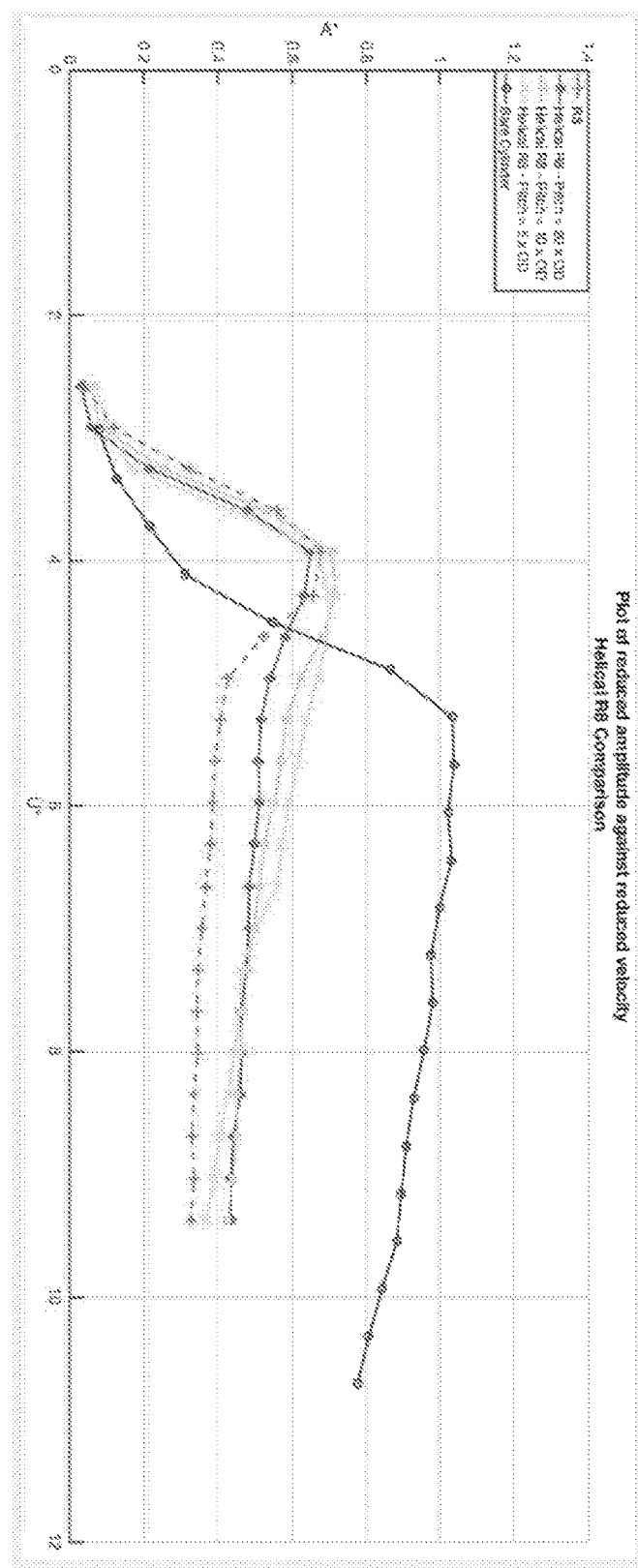
FIG. 15 is a plot of the vibration characteristics of various flow modification devices or cylindrical elements according to embodiments of the invention.

Referring now to FIG. 15, the amplitude of vibration of various flow modification devices 10 or cylindrical elements 100 incorporating helically arranged raised body portions (or curved ridges) according to the invention is plotted against a bare cylinder and an R8 cylinder having substantially parallel raised body portions (or curved ridges). The amplitude of vibration is represented on the y-axis by the non-dimensional quantity $A^*$ and is the mean of the maximum amplitude of vibration for a series of steady state tests. Reduced Velocity $U^*$, which is the freestream velocity divided by the product of the diameter and the natural frequency, is represented on the x-axis. As can be seen in FIG. 15, the R8 cylinder having 8 substantially parallel raised body portions exhibited the lowest amplitude of vibration across the greatest range of velocities. However, an R8 cylinder having helically arranged raised body portions and a helical pitch of 20 times the diameter of the elongate body 12 closely approximated the aforementioned substantially parallel R8 cylinder across the range of velocities tested. As the helical twist was increased, the amplitude of vibration generally increased.

Figure 16:
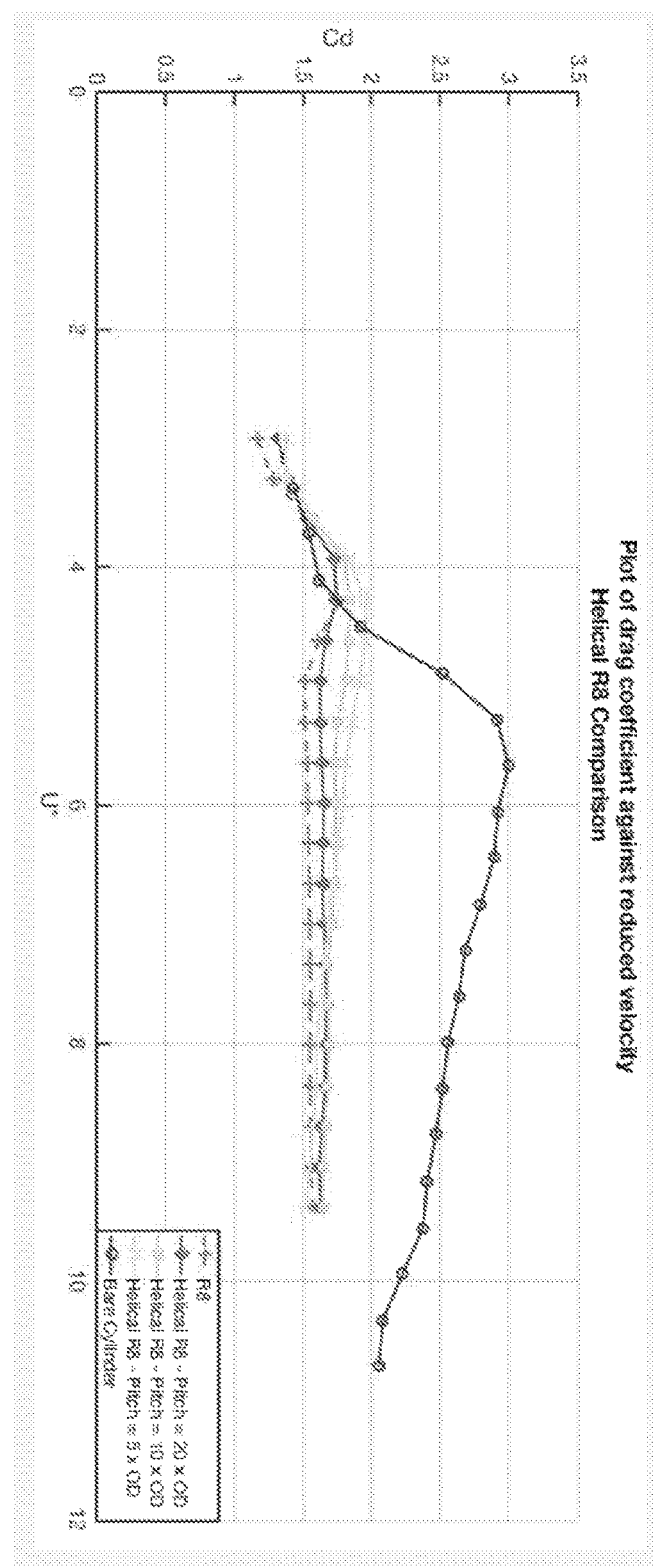
FIG. 16 is a plot of the total dynamic drag characteristics of various flow modification devices or cylindrical elements according to embodiments of the invention.

Referring now to FIG. 16, the total dynamic drag performance of various flow modification devices 10 or cylindrical elements 100 incorporating helically arranged raised body portions (or curved ridges) according to the invention is plotted against a bare cylinder and an R8 cylinder having substantially parallel raised body portions (or curved ridges). The total dynamic drag is represented by the drag coefficient $C_d$, which is plotted on the y-axis. Reduced velocity $U^*$, which is the freestream velocity divided by the product of the diameter and the natural frequency, is represented on the x-axis. As can be seen in FIG. 16, the R8 cylinder having 8 substantially parallel raised body portions exhibited the lowest drag coefficient across the greatest range of velocities. However, as per FIG. 15, an R8 cylinder having helically arranged raised body portions and a helical pitch of 20 times the diameter of the elongate body 12 closely approximated the aforementioned substantially parallel R8 cylinder across the range of velocities tested. As the helical twist was increased, the coefficient of drag generally increased.

The flow modification device 10 or cylindrical element 100 of the present disclosure can be utilised or incorporated into a variety of structures as detailed below.

Figure 10:
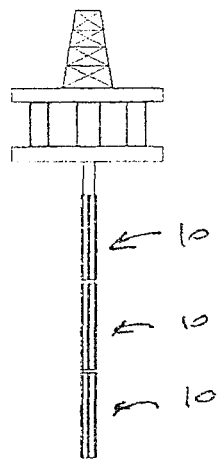
FIG. 10 is a schematic representation of an application of a flow modification device or cylindrical element according to an embodiment of the invention.

FIG. 10 shows an application in which the present flow modification device 10 or cylindrical element 100 may be utilised. In FIG. 10, the flow modification device 10 or cylindrical element 100 is shown as an integral part of an external surface of buoyancy units which are typically required on deep water drilling risers to aid in suspending the weight of the riser.

Figure 11:
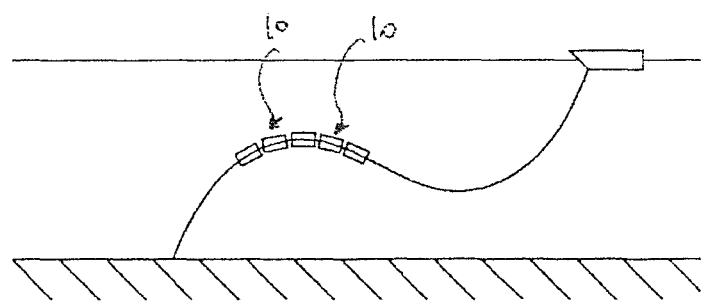
FIG. 11 is a schematic representation of a further application of a flow modification device or cylindrical element according to an embodiment of the invention.

FIG. 11 shows a further application in which the present flow modification device 10 or cylindrical element 100 may be utilised. In FIG. 11, the flow modification device 10 or cylindrical element 100 is shown as an integral part of an external surface of discrete buoyancy units which are utilised to create a compliant wave shape in the depicted steel lazy wave riser or flexible lazy wave riser. By utilising the described flow modification device 10, VIV suppression advantages may result thereby offering enhanced fatigue performance of the underlying structural riser when compared to standard circular cross-section buoyancy units. Drag reduction advantages may also be realised when compared to standard circular cross-section buoyancy units.

Figure 12:
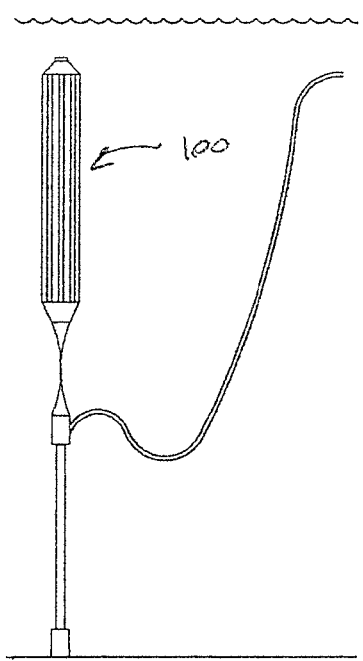
FIG. 12 is a schematic representation of a further application of a flow modification device or cylindrical element according to an embodiment of the invention.

FIG. 12 shows a further application in which the present flow modification device 10 or cylindrical element 100 may be utilised. In FIG. 12, the flow modification device 10 or cylindrical element 100 is shown as an integral part of an external surface of a single discrete large buoyancy unit which provides vertical uplift to an underlying subsea riser structure. Such large buoyancy units are typically subjected to vortex-induced motion effects which can lead to greater problematic drag forces and greater fatigue on the connections and underlying structure. In FIG. 12, the present flow modification device or cylindrical element is shown on the external surface of the buoyancy unit with the longitudinal raised body portions or ridges 14 shown vertically. Alternatively, if the buoyancy unit has a primary axis configured horizontally, then the ridges 14 may be positioned horizontally (i.e., generally parallel to the seabed).

Figure 13:
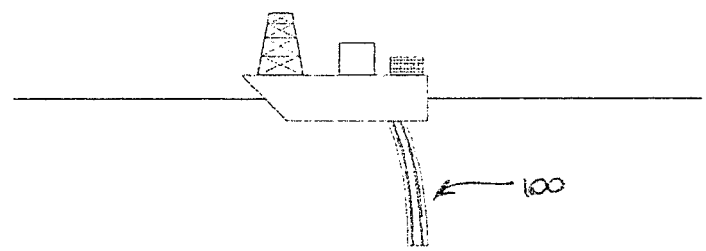
FIG. 13 is a schematic representation of a further application of a flow modification device or cylindrical element according to an embodiment of the invention.

FIG. 13 shows a further application in which the present flow modification device 10 or cylindrical element 100 may be utilised. In FIG. 13, the flow modification device 10 or cylindrical element 100 is shown as an integral part of an external surface of a flexible free-hanging hose. By utilising the described flow modification device 10, VIV suppression and drag advantages may result thereby offering enhanced fatigue performance and drag reduction of the underlying metallic components in the structural hose or riser when compared to standard circular cross-section hoses.

Figure 14:
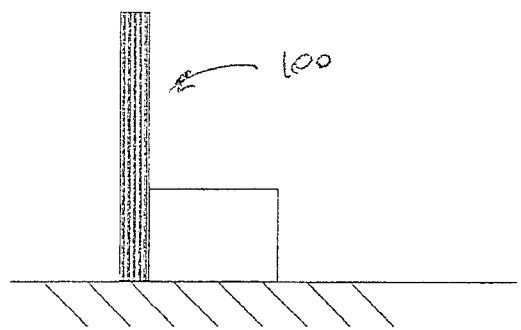
FIG. 14 is a schematic representation of a further application of a flow modification device or cylindrical element according to an embodiment of the invention.

FIG. 14 shows a further application in which the present flow modification device 10 or cylindrical element 100 may be utilised. In FIG. 14, the flow modification device 10 or cylindrical element 100 is shown as an integral part of an external surface of a chimney stack in air. The present flow modification device 10 offers manufacturing advantages over existing technologies as the flow modification device 10 can be formed into the process of manufacturing the base chimney. Manufacturing of the base chimney may be done via a rolled and welded process or via a continuous concrete pour, whereas helical strakes are required to be fitted after the manufacturing of the base chimney.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A flow modification device connectable to a cylindrical element adapted for immersion in a fluid medium, the flow modification device comprising:
    an elongate body having a length and a circular cross-section;
    a plurality of raised body portions disposed about and extending along the length of the elongate body, the raised body portions having a height between 2% and 10% of a diameter of the elongate body, wherein the diameter of the elongate body corresponds to a diameter of a circle intersecting outermost edges of the plurality of raised body portions; and
    an aperture extending through the length of the elongate body, the aperture being adapted to receive the cylindrical element such that the flow modification device is arranged about the cylindrical element; wherein
    the plurality of raised body portions are helically arranged or twisted about a longitudinal axis of the elongate body,
    the plurality of raised body portions are adapted to reduce vortex-induced vibration and/or drag on the cylindrical element when the flow modification device is connected to the cylindrical element and the connected device and the cylindrical element are immersed in the fluid medium and there is relative movement between the connected flow modification device and the cylindrical element and the fluid medium, and
    the plurality of raised body portions are curved or rounded ridges which define respective curved shape grooved body portions therebetween, to provide a succession of raised and grooved body portions that present a substantially continuous geometry having no abrupt discontinuities in surface shape.

2. The flow modification device of claim 1, wherein the helically twisted raised body portions have a helical pitch of between 5 and 20 times the diameter of the elongate body.

3. The flow modification device of claim 2, wherein the helical pitch is substantially constant along the length of the elongate body.

4. The flow modification device of claim 2, wherein the helical pitch is variable along the length of the elongate body.

5. The flow modification device of claim 1, wherein the elongate body includes between 3 and 16 raised body portions disposed about the elongate body.

6. The flow modification device of claim 5, wherein the elongate body includes between 5 and 9 raised body portions disposed about the elongate body.

7. The flow modification device of claim 1, wherein each of the plurality of raised body portions have radii between 2% and 38% of the diameter of the elongate body.

8. The flow modification device of claim 1, wherein each of the respective grooved body portions are generally concave.

9. The flow modification device of claim 8, wherein each the respective grooved body portions have radii between 0.75% and 78% of the diameter of the elongate body.

10. The flow modification device of claim 1, wherein the elongate body includes opposite conical tapering ends.

11. The flow modification device of claim 1, wherein the cylindrical element is a continuous rubber or metal extrusion.

12. The flow modification device of claim 1, wherein the cylindrical element is a continuous composite winding.

13. The flow modification device of claim 1, wherein the cylindrical element is a continuous reinforced concrete element.

14. The flow modification device of claim 1, wherein the cylindrical element is a marine riser, cable, umbilical, or other tubular member.

15. A flow modification system to reduce vortex-induced vibration and/or drag on a cylindrical element immersed in a fluid medium, the system comprising:
    a plurality of flow modification devices according to claim 1, wherein
    each of the plurality of flow modification devices is arranged about and extends along the cylindrical element; and
    a security mechanism to releasably secure each of the plurality of flow modification devices about the cylindrical element.

16. The flow modification system of claim 15, wherein a helical pitch of a first flow modification device is a same as a helical pitch of a second adjacent flow modification device.

17. The flow modification system of claim 15, wherein a helical pitch of a first flow modification device is different than a helical pitch of a second adjacent flow modification device.

18. A method for reducing vortex-induced vibration and/or drag on a cylindrical element immersed in a fluid medium, the method comprising the steps of:
    arranging a plurality of flow modification devices according to claim 1 about the cylindrical element; and
    releasably securing each of the plurality of flow modification devices to the cylindrical element.

* * * * *